United States Patent

Walch

[11] 4,010,118
[45] Mar. 1, 1977

[54] HIGH TEMPERATURE HOT CONDUCTORS
[75] Inventor: Horst Walch, Munich, Germany
[73] Assignee: Siemens Aktiengesellschaft, Berlin & Munich, Germany
[22] Filed: Apr. 19, 1976
[21] Appl. No.: 678,067
[30] Foreign Application Priority Data
Apr. 28, 1975 Germany ............................ 2518865
[52] U.S. Cl. .............................. 252/521; 106/73.2; 338/22 R
[51] Int. Cl.$^2$ ........................................... H01B 1/08
[58] Field of Search ................... 252/521; 106/73.2; 338/22 R
[56] References Cited
UNITED STATES PATENTS
3,913,057 10/1975 Ushida et al. ................. 252/521 X OTHER PUBLICATIONS
Chemical Abstracts, vol. 83 (1975), 208943f, "Properties of Ceramics From Gadolinium and Erbium Oxides."

Primary Examiner—Edward A. Miller
Assistant Examiner—E. Suzanne Parr
Attorney, Agent, or Firm—Hill, Gross, Simpson, Van Santen, Steadman, Chiara & Simpson

[57] ABSTRACT
Hot conductors containing a mixture of cerium oxide and gadolinium oxide are suitable for use at high temperatures.

3 Claims, 1 Drawing Figure

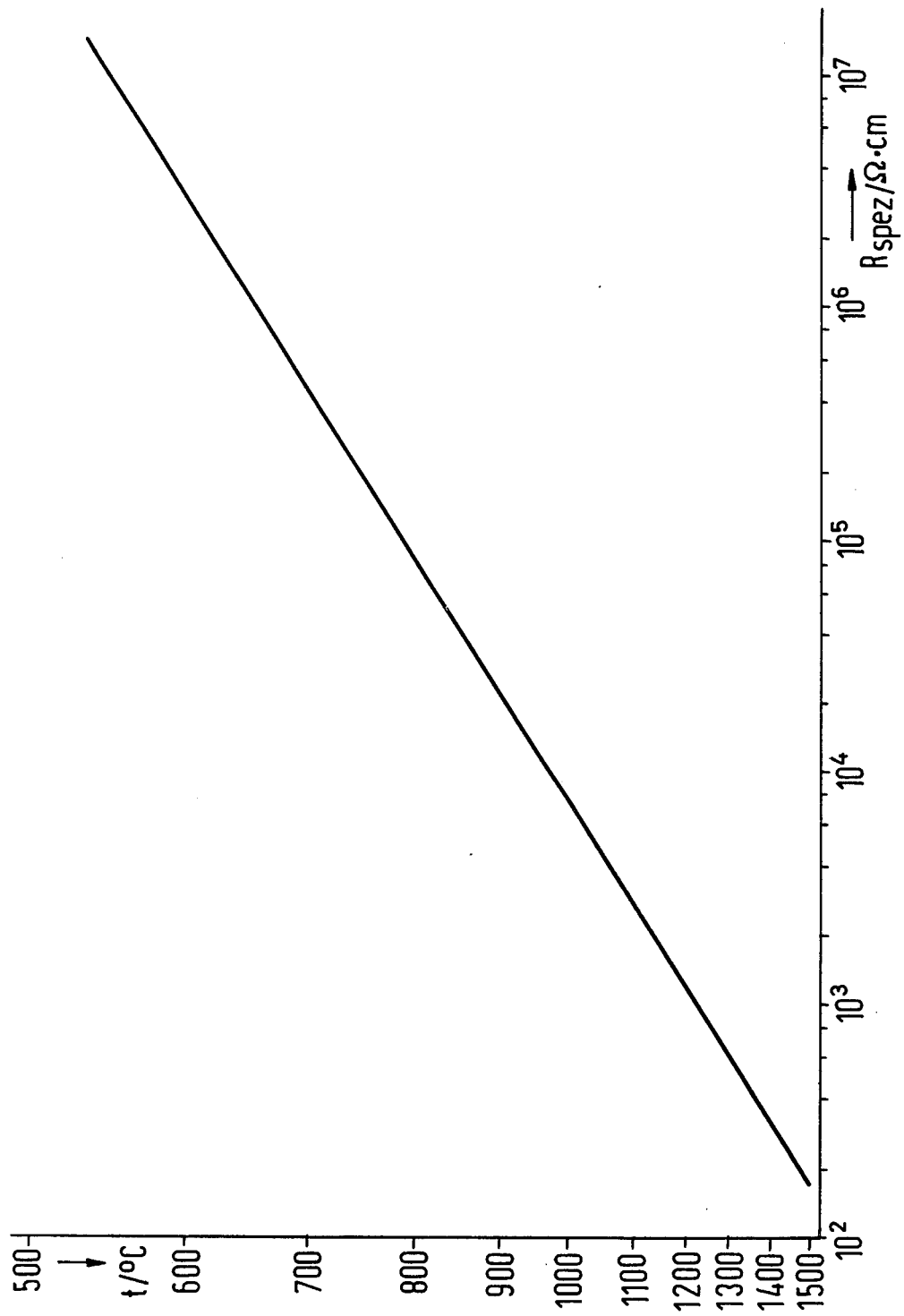

HIGH TEMPERATURE HOT CONDUCTORS

BACKGROUND OF THE INVENTION

1. Field of the Invention

The invention relates to hot conductors and somewhat more particularly to hot conductors composed of a sintered oxide mixture containing rare earth metals.

2. Prior Art

Resistor elements which possess a negative temperature coefficient of resistance are generally referred to as hot conductors. This type of resistor is also known as a thermistor or a NTC-resistor. Generally, such hot conductors are composed of sintered oxides of manganese, iron, cobalt, nickel, copper, zinc and mixtures thereof. Hot conductors composed of such metal oxides and mixtures thereof are typically not suited for higher temperature applications because these metal oxides and mixtures thereof decompose at temperatures above about 600° C. Further, since irreversible changes may occur within hot conductors of this type even at low temperatures, the prior art has generally limited their usages to maximum temperatures in the range of about 300° to 350° C.

"Zetschrift fuer Elektrochemie" (Journal for Electro-Chemistry) 1959, pages 269–274 suggests that the conductivity of rare earths increases with rising temperatures, however, no suggestions are made for incorporating rare earths or mixtures thereof in hot conductors.

In addition, the prior art is aware that hot conductors usable at higher or high temperatures may be produced from a mixture of a rare earth and zirconium oxide. For example, British patent specification No. 874,882 suggests a hot conductor comprised of a mixture of yttrium and zirconium oxide, while German Offenlegungsschrift No. 2,333,189 suggests a hot conductor comprised of a mixture of praseodymium and zirconium oxide. However, hot conductors composed of such materials exhibit a varistor effect, i.e., the resistance value of such hot conductors is dependent not only upon the temperature but also on the applied voltage.

SUMMARY OF THE INVENTION

The invention provides a hot conductor comprised of a sintered oxide material containing a mixture of cerium oxide and gadolinium oxide and which are useful for measuring and controlling high temperature environments.

A preferred embodiment of a hot conductor produced in accordance with the principles of the invention contains about 1 to 50 atoms% of cerium.

BRIEF DESCRIPTION OF THE DRAWINGS

The FIGURE is a graphical illustration of the specific resistance $R_{spez}$ of a hot conductor produced in accordance with the principles of the invention as it relates to temperature, $t$, over the range 500° to 1500° C.

DESCRIPTION OF THE PREFERRED EMBODIMENTS

The invention provides a hot conductor for measuring and controlling high temperatures. The hot conductors of the invention do not have a varistor effect and have a high temperature coefficient of resistance while possessing a low specific resistance.

In accordance with the principles of the invention, a hot conductor is formed so as to contain a mixture of cerium oxide and gadolinum oxide. In a preferred embodiment of the invention the hot conductors contain about 1 to 50 atom% cerium.

Hot conductors produced in accordance with the principles of the invention may be used up to extremely high temperatures. This is due to the fact that rare earths do not decompose under temperatures of up to at least 1750° C since rare earths have a very high formation enthalpy. In addition, hot conductors formed in accordance with the principles of the invention have a relatively low specific resistance at high temperatures and exhibit no varistor effect. The high temperature coefficient exhibited by hot conductors of the invention renders them superior to the thermometals and thermo-couples normally used in high temperature environments.

With the foregoing general discussion in mind, there is now presented a detailed example which will illustrate to those skilled in the art the manner in which the invention is carried out. However, this example is not to be construed as limiting the scope of the invention in any way.

EXAMPLE

A starting mixture of cerium oxide (purity of 99.9%) and gadolinium oxide (purity of 99.9%) was prepared so that the mixture contained about 12.5 atom% of cerium. This mixture was dissolved in hydrochloric acid and the rare earths were then conventionally co-precipitated as oxalates. The precipitated oxalate was filtered off, calcinated at a temperature of about 900° C and then finely ground to produce substantially uniform size oxide particles. For the production of a thermistor (hot conductor), the calcinated and ground oxide mixture was provided with a suitable bonding agent and formed into a bead between two parallelly clamped wires composed of platinum or a platinum alloy. This structure was then subjected to a preliminary drying and the thermistor bead was then sintered at a temperature of about 1700° C in a suitable furnace containing an oxidizing atmosphere. The resultant thermistor was subjected to a high temperature environment and the specific resistance thereof measured. The average results are graphically illustrated in the FIGURE.

The FIGURE illustrates the specific resistance, $R_{spez}$, of the hot conductor produced in accordance with the foregoing example in relation to a temperature, $t$, over the range of about 500° to 1500° C. As can be seen, in this temperature range the specific resistance decreases in a linear manner from about $10^7$ Ohm.cm to about $10^2$ Ohm.cm. The specific resistance-temperature relation of the hot conductors produced in accordance with the principle of the invention, follow the equation:

$$\ln R_{spez} = \ln A + B/T$$

wherein

A and B are material constants, and

T is the absolute temperature.

This relation is conventional for oxide-containing hot conductors.

Depending upon the desired field of use, the sintered thermistor beads may be provided with a glass coating or may be placed in a suitable housing composed of glass or quartz. Such protective coatings or housings are particularly advisable when the thermistor or hot conductor is to be used for measuring temperature in a reactive environment, such as motor vehicle exhaust gases.

Hot conductors produced in accordance with the principles of the invention are generally useful for temperature measurement and control of temperatures above about 500° C.

The hot conductors produced in accordance with the principles of the invention may be formed not only in bead form described in the example, but also in any desired form, such as in the form of a plate or a tube.

As is apparent from the foregoing specification, the present invention is acceptable of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appendant claims.

I claim:

1. A hot conductor for use in high temperature environments comprised of a sintered oxide material consisting essentially of containing a mixture of cerium oxide and gadolinium oxide.

2. A hot conductor as defined in claim 1 wherein said mixture consisting essentially of about 1 to 50 atom% of cerium.

3. A hot conductor as defined in claim 1 wherein said mixture consisting essentially of about 12.5 atom% of cerium and about 87.5 atom% gadolinium.

* * * * *